United States Patent
Callahan

(10) Patent No.: US 7,497,478 B2
(45) Date of Patent: Mar. 3, 2009

(54) DUCT ASSEMBLY

(75) Inventor: Douglas J. Callahan, Rochester Hills, MI (US)

(73) Assignee: Miniature Precision Components, Inc., Southfield, MI (US)

( * ) Notice: Subject to any disclaimer, the term of this patent is extended or adjusted under 35 U.S.C. 154(b) by 0 days.

(21) Appl. No.: 10/902,685

(22) Filed: Jul. 29, 2004

(65) Prior Publication Data

US 2006/0022460 A1 Feb. 2, 2006

(51) Int. Cl.
*F16L 37/00* (2006.01)

(52) U.S. Cl. ............... 285/305; 285/288.1; 285/321

(58) Field of Classification Search .......... 285/423, 285/903, 288.1, 276, 319, 921, 403, 400, 285/399, 379, 307, 321, 305, 108, 95

See application file for complete search history.

(56) References Cited

U.S. PATENT DOCUMENTS

| | | | | |
|---|---|---|---|---|
| 3,291,670 A * | 12/1966 | Usab | .......................... | 156/245 |
| 3,428,340 A * | 2/1969 | Pelton | .......................... | 285/95 |
| 3,584,902 A * | 6/1971 | Vyse | .......................... | 285/305 |
| 4,062,569 A * | 12/1977 | Kay | .......................... | 285/4 |
| 4,519,449 A | 5/1985 | Hoskins et al. | | |
| 4,538,679 A | 9/1985 | Hoskins et al. | | |
| 4,591,192 A * | 5/1986 | Van Exel et al. | ............. | 285/423 |
| 4,612,953 A | 9/1986 | Caroll et al. | | |
| 4,640,534 A | 2/1987 | Hoskins et al. | | |
| 4,749,214 A | 6/1988 | Hoskins et al. | | |
| 4,867,487 A * | 9/1989 | Phillis | ......................... | 285/305 |
| 4,875,709 A | 10/1989 | Caroll et al. | | |
| 4,902,043 A | 2/1990 | Zillig et al. | | |
| 4,929,293 A * | 5/1990 | Osgar | ......................... | 156/158 |
| 5,909,901 A | 6/1999 | Zillig et al. | | |
| 6,199,916 B1 * | 3/2001 | Klinger et al. | ............... | 285/319 |
| 6,474,698 B2 * | 11/2002 | Dobler et al. | ................ | 285/321 |
| 6,733,047 B1 * | 5/2004 | Stieler | ......................... | 285/319 |
| 6,832,785 B1 * | 12/2004 | Zitkovic, Jr. | ................. | 285/331 |
| 6,837,525 B2 * | 1/2005 | Miyajima | .................... | 285/319 |

\* cited by examiner

*Primary Examiner*—Aaron M Dunwoody
(74) *Attorney, Agent, or Firm*—Harness, Dickey & Pierce, P.L.C.

(57) ABSTRACT

A duct assembly comprises a collar that defines a bore and has a first plurality of slots and a second plurality of slots formed therethrough. The collar includes an annular wall formed within the bore and an end groove formed at one end thereof. A duct has an end fitted within the end groove. A ring is disposed within the collar and abuts the annular wall. A ring retainer is disposed within the collar and abuts the ring. The ring retainer has a plurality of tabs formed thereon that fit within the first plurality of slots. An end of a port extends into the collar. The port has an annular groove formed along its circumference. A clip that has a plurality of arcs formed along its length extends around the collar. The arcs extend through the second plurality of slots into the annular groove of the port.

11 Claims, 10 Drawing Sheets

DUCT ASSEMBLY

FIELD OF THE INVENTION

The present invention relates to a duct assembly and more particularly to a sealed connection for a duct assembly.

BACKGROUND OF THE INVENTION

The transfer of gasses and fluids within the modern combustion engine is integral to its efficient operation. For example, a charged air cooler that operates to increase the output power of a typical motor vehicle engine compresses air flow to improve engine performance. This charged air cooler system has numerous air flow requirements. Air flow must be routed through various components such as the air filter, heat exchanger, the charger compressor, and through the engine.

Air flow is routed using tubular duct assemblies. These duct assemblies must be able to withstand the environment in which they are employed. For example, the duct assemblies in a charged air cooler system must resist a continuous temperature upwards of 250 degrees Fahrenheit with pressures upwards of 30 pounds per square inch. In order to withstand these pressures and temperatures, the typical duct assembly has a steel tube body with silicone and rubber end connectors. The end connectors are assembled with up to 4 band clamps and 2 silicone hoses. These end connectors prevent the fluid from bleeding out of the assembly along leak paths.

While previous duct assembly designs have been satisfactory, there remains room in the art for improvement. Accordingly, it is an object of the present invention to provide the art with a duct assembly having a reduced cost of construction, reduced weight, fewer leak paths, a simple installation, aesthetically pleasing, and easily recyclable.

SUMMARY OF THE INVENTION

A duct assembly is provided having a collar that defines a bore and has a first plurality of slots and a second plurality of slots formed therethrough. The collar includes an annular wall formed within the bore and an end groove formed at one end thereof. The collar is secured to a duct by fitting an end of the duct within the end groove. A ring is disposed within the collar and abuts the annular wall. A ring retainer is also disposed within the collar and abuts the ring. The ring retainer has a plurality of tabs formed thereon that fit within the first plurality of slots, thereby securing the ring retainer to the collar. An end of a port extends into the collar. The port has an annular groove formed along its circumference. A clip that has a plurality of arcs formed along its length extends around the collar. The arcs extend through the second plurality of slots into the annular groove of the port thereby securing the port to the collar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
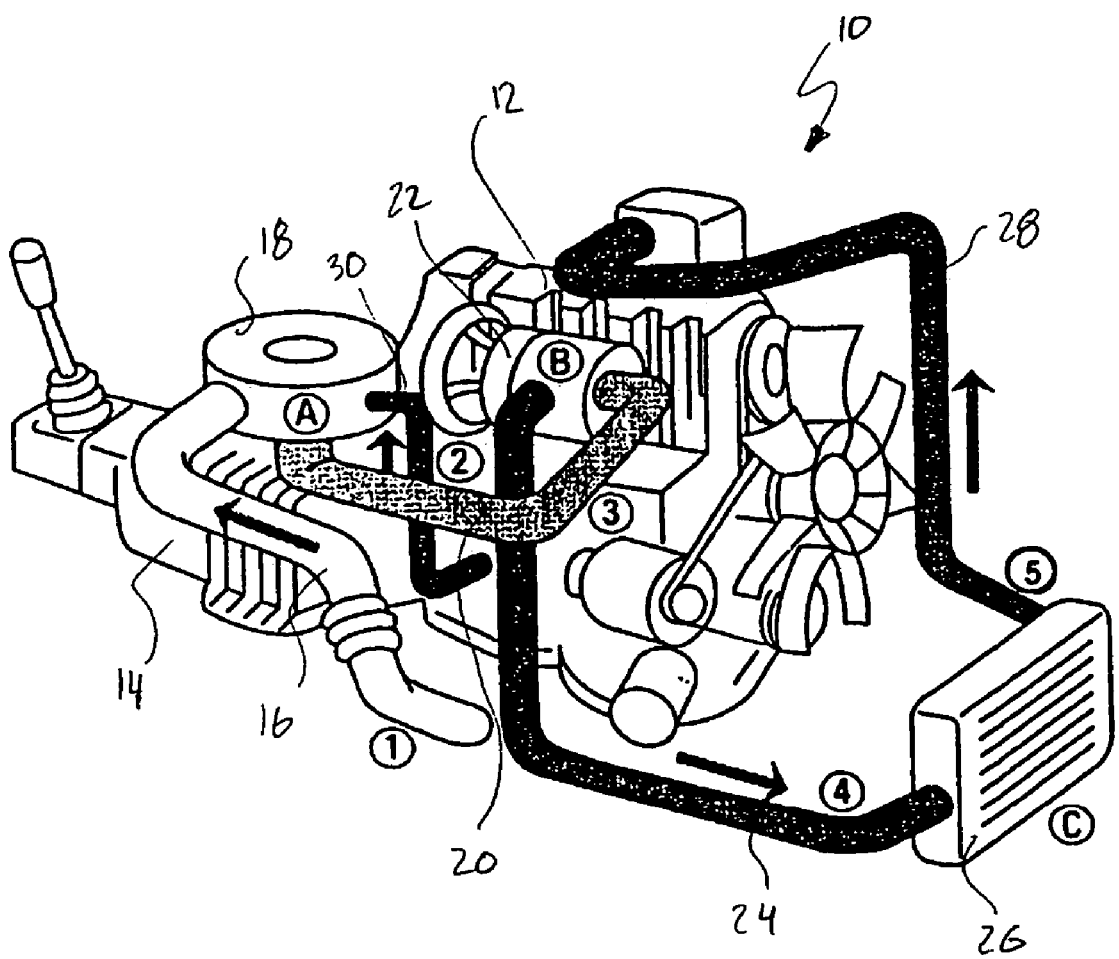
FIG. 1 is a perspective view of a powertrain with a supercharger air cooler system having duct assemblies constructed in accordance with the present invention.

With reference to FIG. 1 of the drawings, an exemplary powertrain of a motor vehicle having a supercharger air cooler system using duct assemblies that are constructed in accordance with the teachings of the present invention is generally indicated by reference numeral 10. The powertrain 10 includes an engine 12 whose output is transmitted to a transmission 14. The supercharger air cooler system is used to increase the rate of air flow to the engine 12

Atmospheric or dirty air flow is drawn into a dirty air intake duct 16 to an air filter 18 mounted within the motor vehicle. The air filter 18 removes particulate matter from the atmospheric air flow, typically using finely meshed screens. A clean air duct 20 then channels the air flow to a supercharger air compressor 22 mounted proximate to the engine 12. The supercharger air compressor 22 compresses the air, thereby increasing the rate of air flow through the engine 12 and increasing performance. Compression of the air typically increases the temperature of the air flow. A charged air duct 24 then transports the compressed air flow to a heat exchanger 26, typically mounted forward of the engine 12. The heat exchanger 26 cools the charged air flow to a more desirable temperature. The air is then moved through a cooled charge air duct 28 to the engine 12 where it is used in the combustion process. Finally, air flow moves through a crankcase venting duct 30 back to the air filter 18 where it is recirculated to the engine 12.

The air ducts 16, 20, 24, 28, and 30 are illustrated as having various tube shapes and lengths, however, all are constructed in a fashion according to the teachings of the present invention, as will be described in greater detail below. Moreover, various other applications for the duct assemblies may be employed, for example in oil cooler systems, transmission lines, oil fill tubing, or coolant tubing assemblies.

Figure 2:
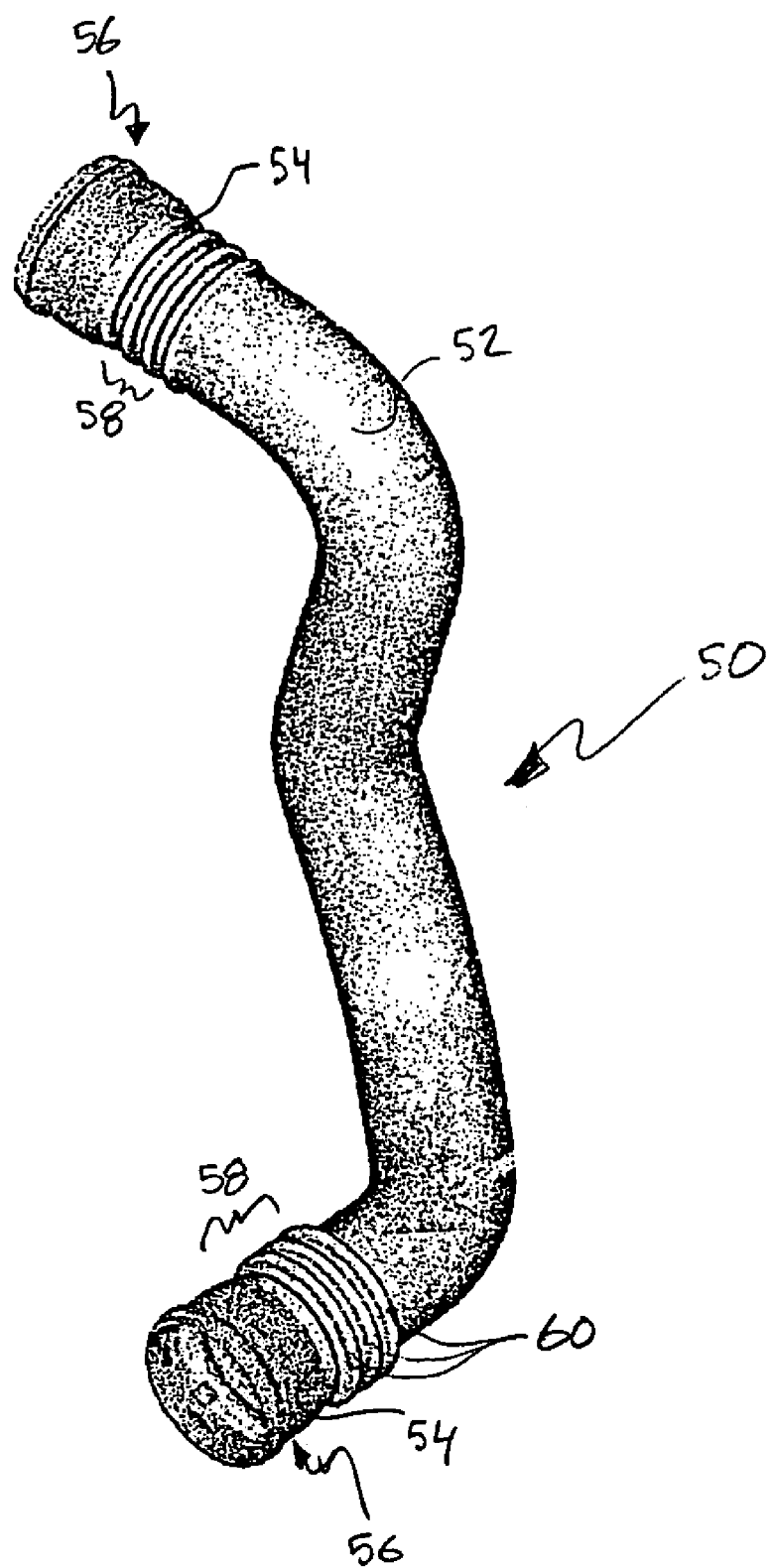
FIG. 2 is a perspective view of an exemplary duct assembly constructed in accordance with the present invention.

Referring now to FIG. 2, an exemplary duct assembly constructed according to the principles of the present invention is generally indicated by reference numeral 50. The duct assembly 50 includes a tubular duct 52 having opposing open ends 54. Connectors 56 are mounted on each opposing end 54 in a manner to be described in greater detail below. A pair of flexible bellows 58 are mounted near the opposing ends 54 of the duct 52. The flexible bellows 58 include convolutions 60 that are formed with a degree of flexibility. This flexibility in turn permits the opposing ends 54 to have some limited range of movement relative to the rest of the duct 52. In this regard, the convolutions 60 deflect (e.g., fold or unfold) in response to the movement of the opposing ends 54. Likewise, flexible bellow portions may be included throughout the length of the duct 52.

In the particular example provided, the duct 52 is a cylindrical tube with multiple bends throughout its length and made from a single wall unitary thermoplastic. However, it should be appreciated that the duct 52 may be of any shape and size with any amount of bends or turns along its length, and be of various other materials, its configuration defined only by the environment of its intended use.

Figure 3:
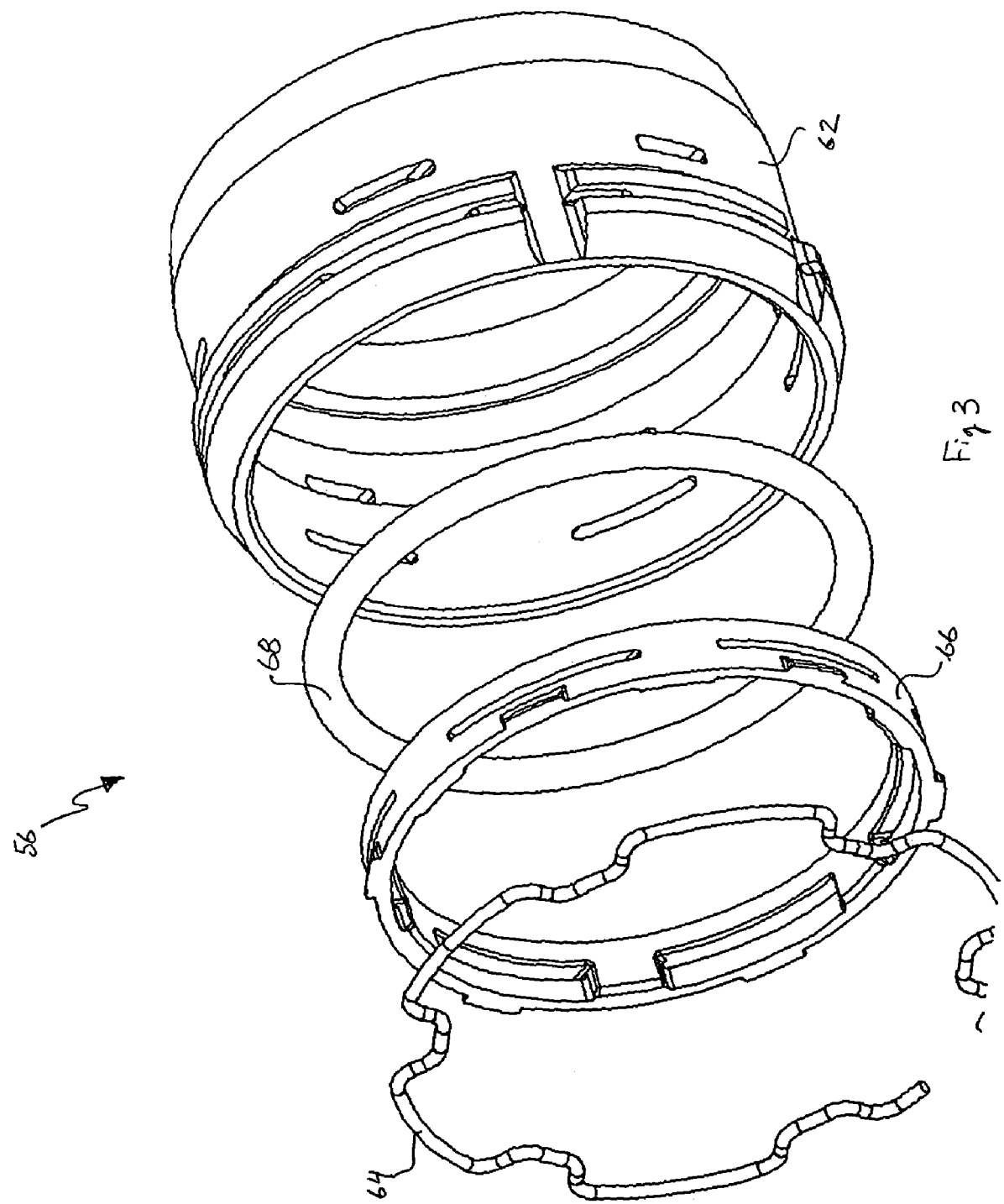
FIG. 3 is an exploded perspective view of an end connection for use with the duct assembly.

With reference to FIG. 3, the connector 56 includes a collar 62, a clip 64, a ring retainer 66, and an o-ring 68. The collar 62 is mounted to one or both ends 54 of the duct assembly 50 and essentially holds the remaining components of the connector 56 in place. The clip 64 is mounted externally around the collar 62 and the ring retainer 66 is mounted to the interior of the collar 62. The ring retainer 66 aids in securing the o-ring 68 within the connector 56. A more detailed description of the assembly of the connector 56 will be provided below.

Figure 4:
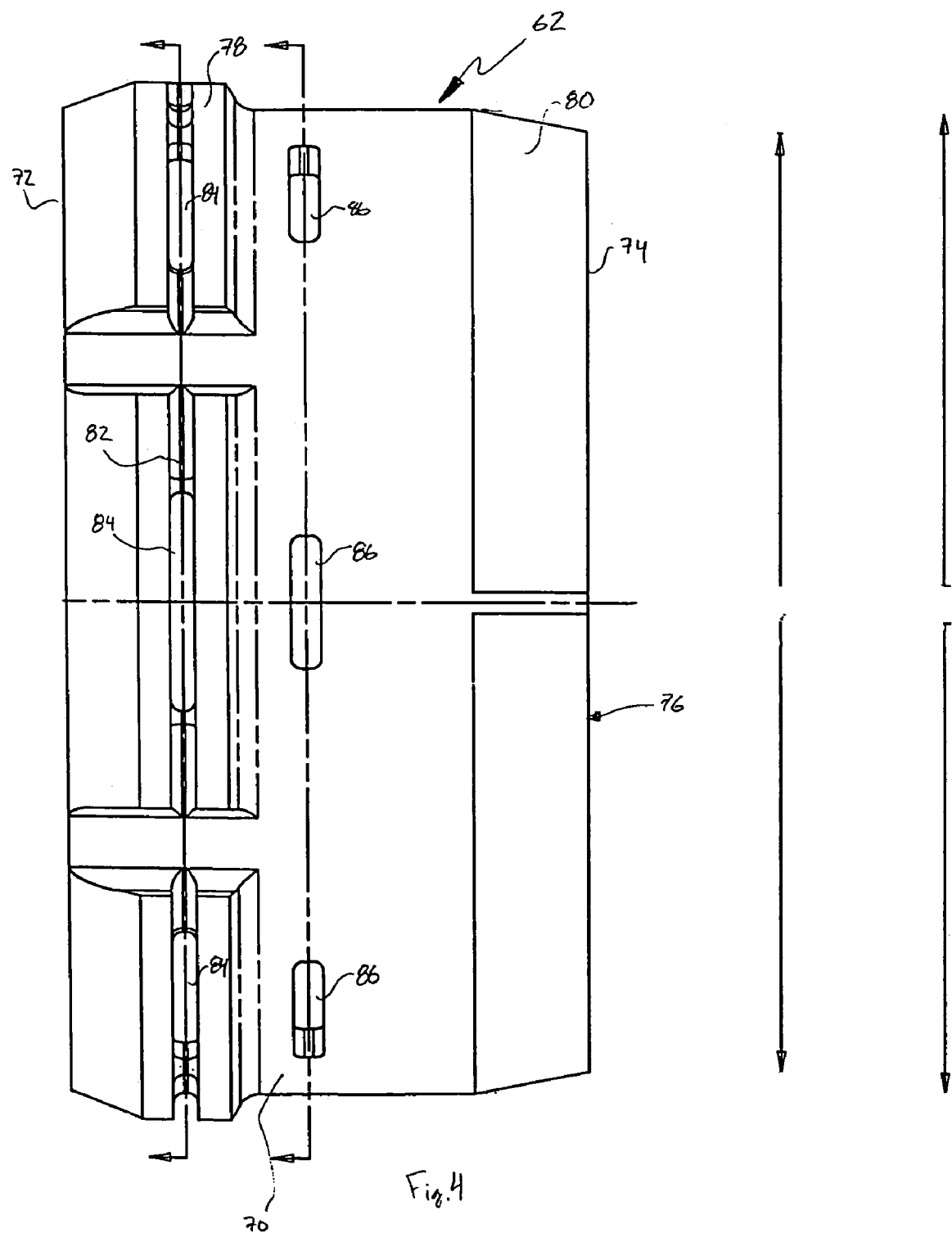
FIG. 4 is a side plan view of a collar for use with the duct assembly.
Figure 5:
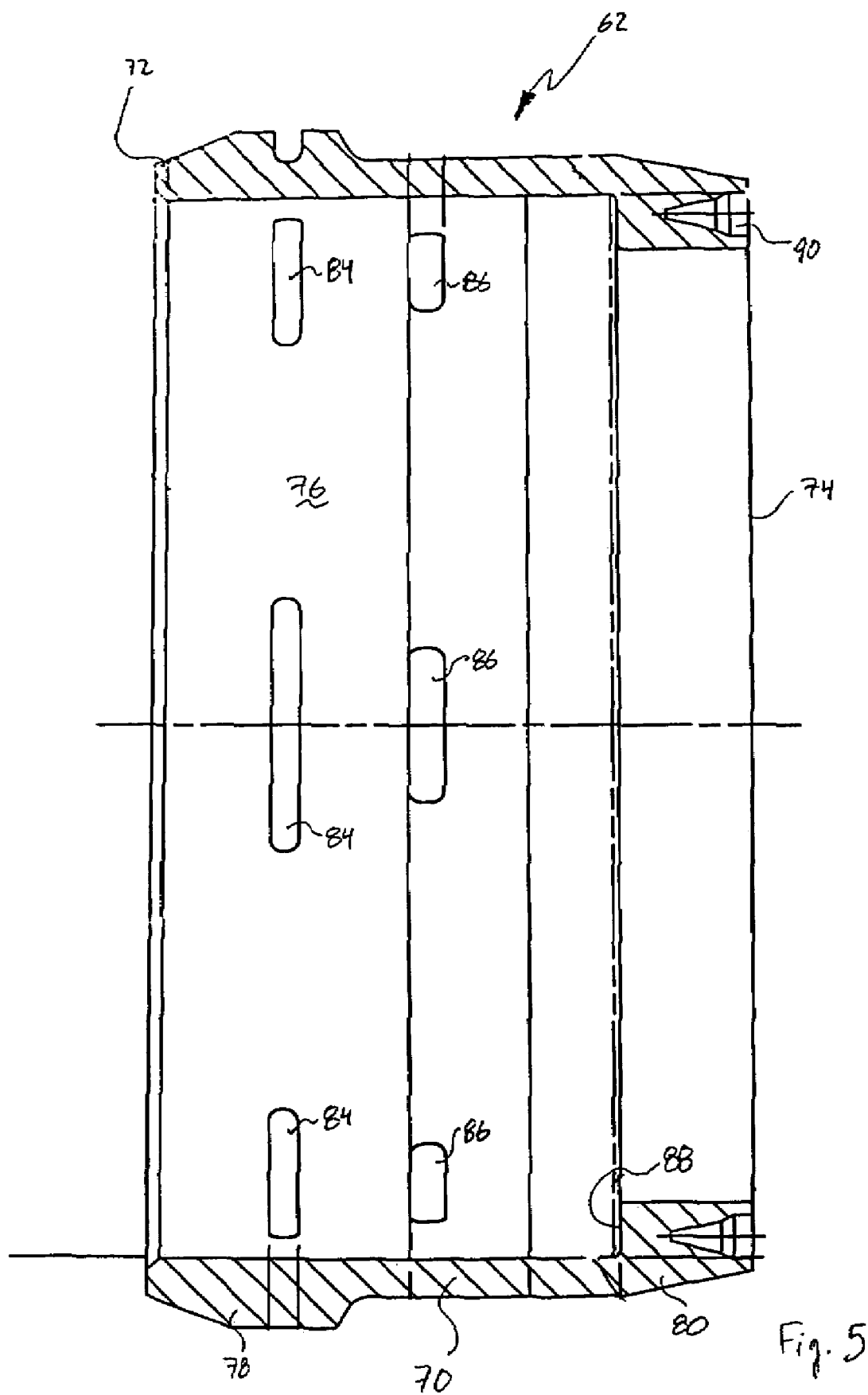
FIG. 5 is a side sectional view of the collar.

With reference to FIGS. 4 and 5, the collar 62 has a hollow and generally cylindrical body 70 with a receiver end 72 for receiving a connector port, as will be described below, and a fixed end 74 adapted to receive the ends 54 of the duct 52. The collar 62 defines an inner cavity 76. The body 70 has an enlarged portion 78 proximate to the receiver end 72 and a reduced portion 80 proximate to the fixed end 74. The enlarged portion 78 is defined by an increased outer radius relative to the body 72, and the reduced portion 80 is defined by a decreased outer radius relative to the body 72.

A clip groove 82 is formed in the enlarged portion 78 along the circumference of the collar 62. A plurality of clip slots 84 are formed in the collar 62 and extend into the inner cavity 76. The clip slots 84 are spaced at equal intervals along the circumference of the enlarged portion 78 and are located within the clip groove 82. The clip slots 84 are sized to receive portions of the clip 64, as will be described below.

A plurality of ring slots 86 are formed in the body 70 of the collar 62 and extend into the inner cavity 76. The ring slots 86 are spaced at equal intervals along the circumference of the body 70 and are sized to receive portions of the ring retainer 60, as will be described below.

As best seen in FIG. 5, the inner cavity 76 includes an annular wall 88 formed in the reduced portion 80. The annular wall 88 extends along the circumference of the inner cavity 76. The plane of the annular wall 88 faces the receiver end 72.

The reduced portion 80 defines an end groove 90. The end groove 90 extends from the fixed end 74 into the reduced portion 80 and is sized to receive the ends 54 of the duct 52.

Figure 6:
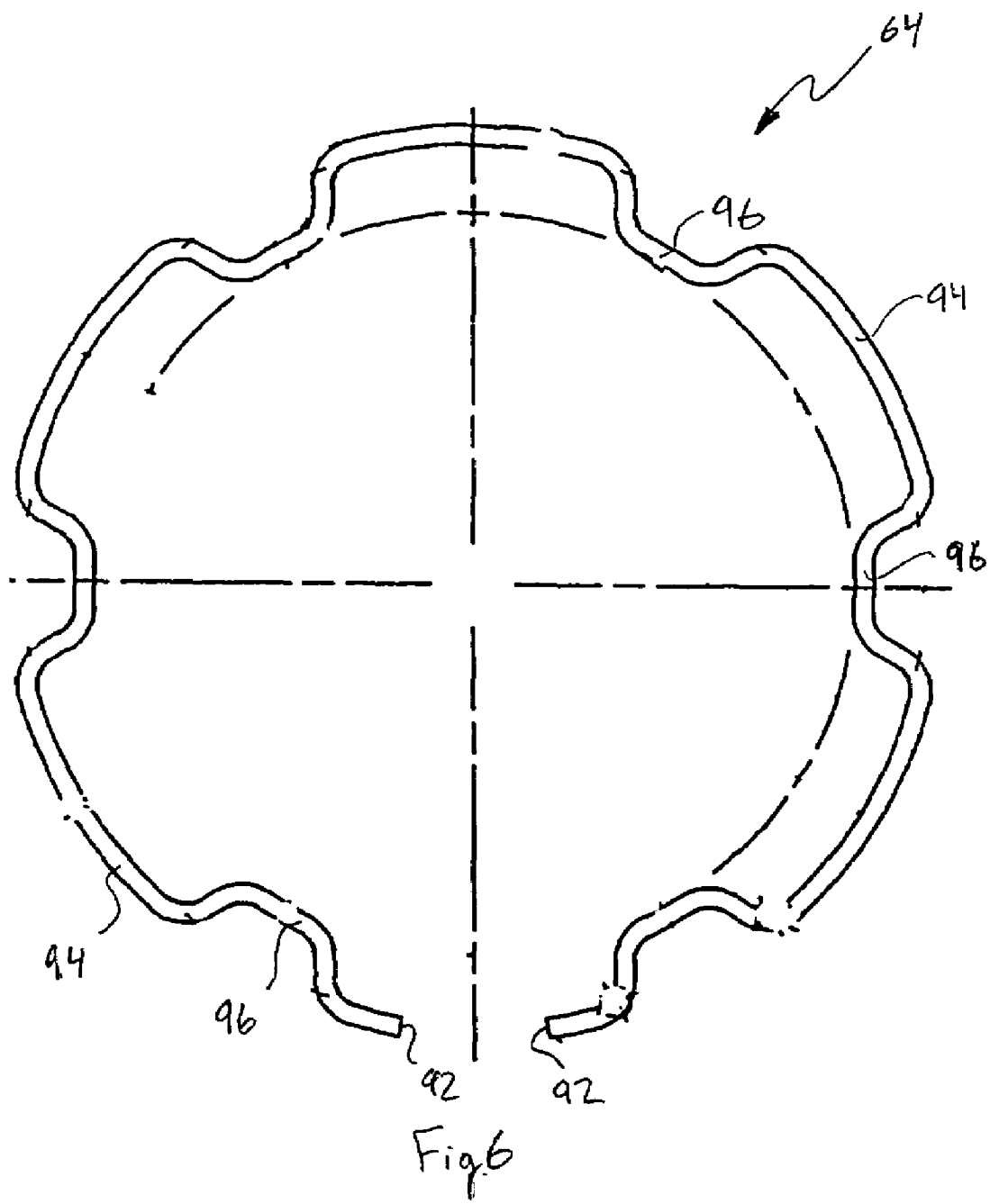
FIG. 6 is a front plan view of a clip for use with the duct assembly.

With reference to FIG. 6, the clip 64 is approximately circular in shape with free ends 92 proximate to each other. Preferably the clip 64 is formed from a heavy gauge wire of stainless steel or some other suitably strong material. The clip 64 includes a series of alternating protrusions 94 and valleys 96 formed along its length. The spacing of the valleys 96 along the length of the clip 64 matches the spacing of the clip slots 84 formed in the collar 62. Moreover, the radius of the protrusions 94 matches that of the outer radius of the groove 82 formed in the collar 62.

Figure 7:
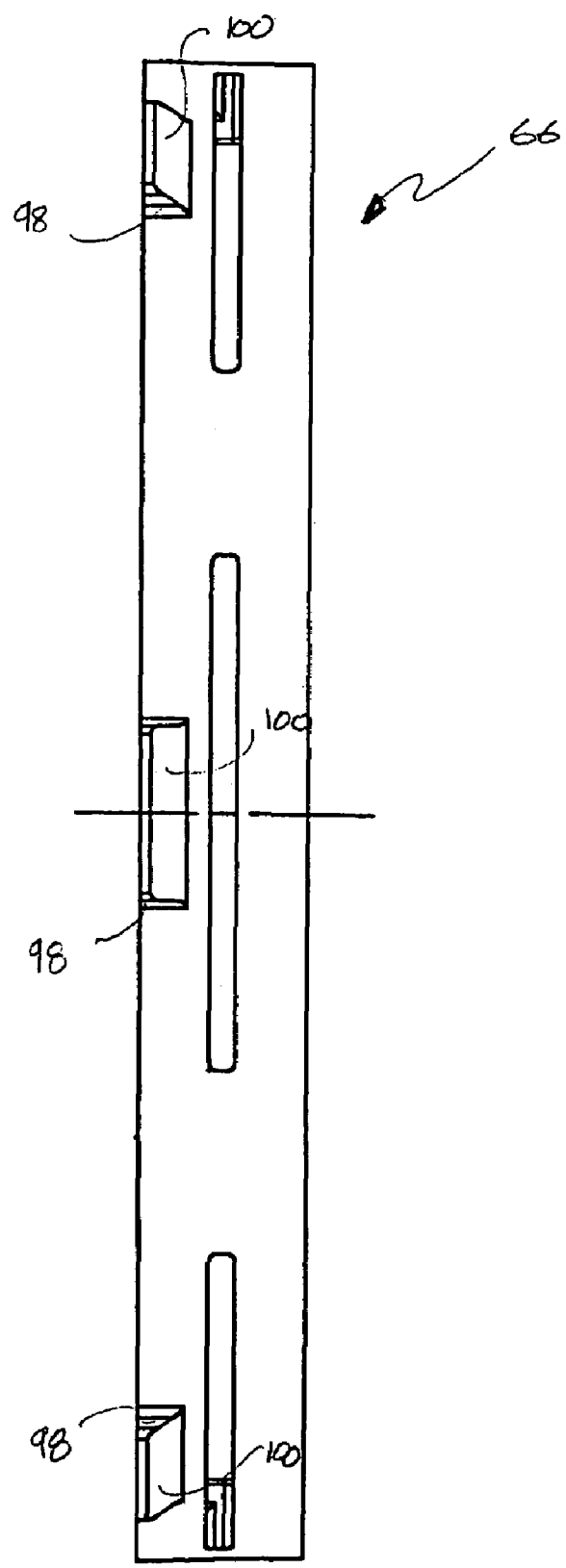
FIG. 7 is a side plan view of a ring retainer for use with the duct assembly.

With reference to FIG. 7, the ring retainer 66 is annular with a plurality of tabs 98 formed along its outer circumference. The tabs 98 each have sloped front faces 100 that aid in the mounting of the ring retainer 66 to the collar 62. The tabs 98 are spaced to match the spacing of the ring slots 86 formed in the collar 62.

Figure 8:
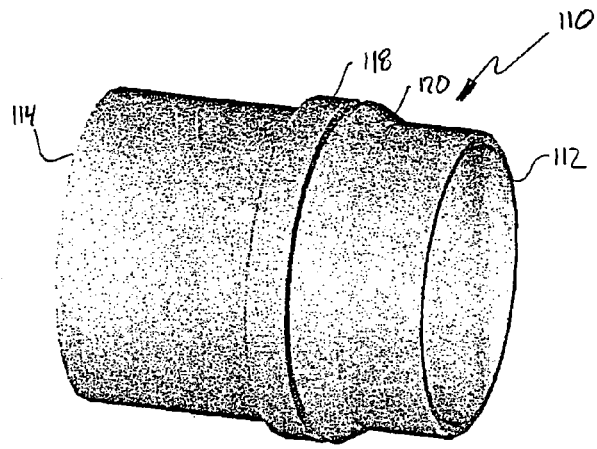
FIG. 8 is a perspective view of a connector port designed to couple with the duct assembly.
Figure 9:
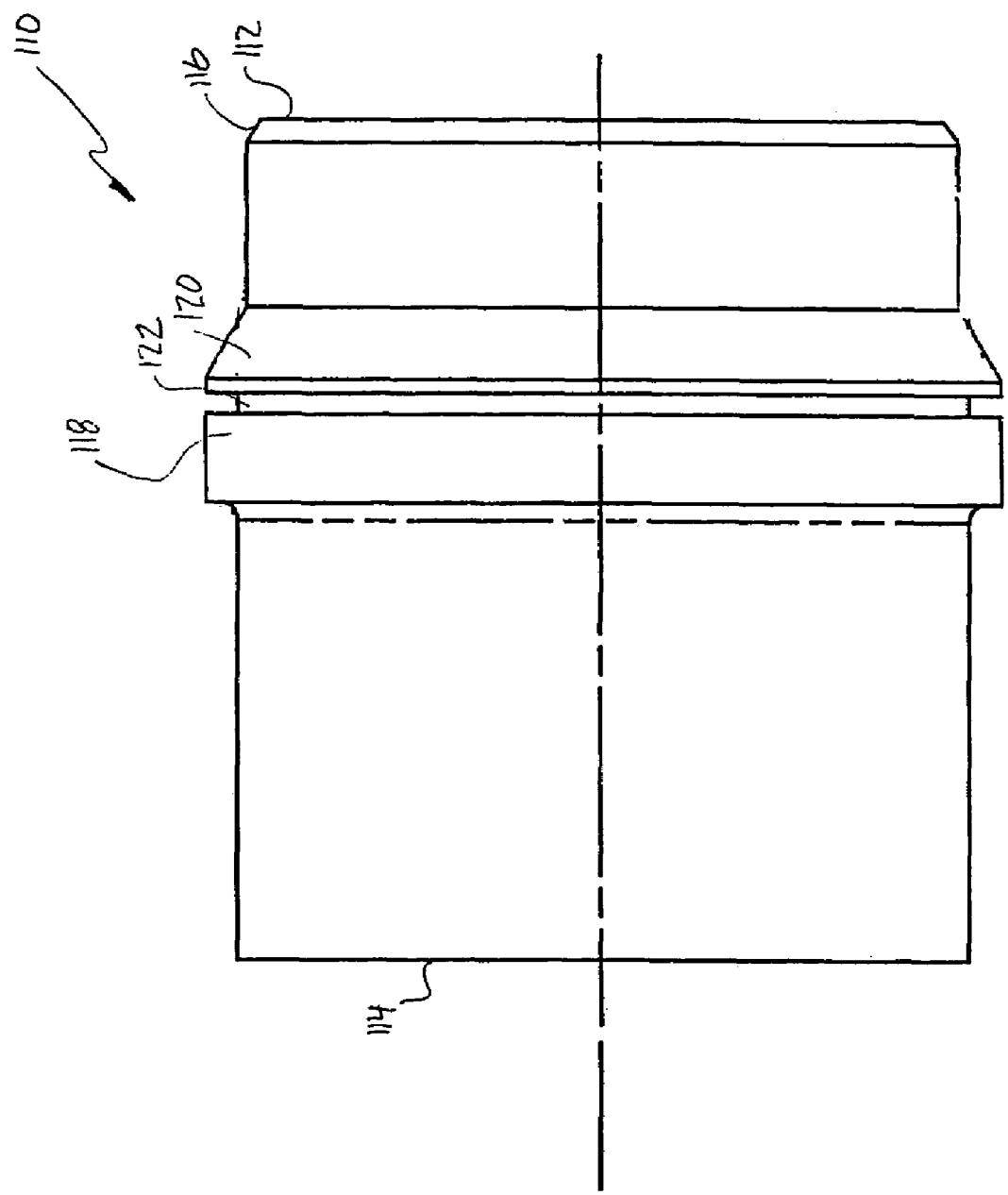
FIG. 9 is a side plan view of the connector port.

Referring now to FIGS. 8 and 9, a connector port, generally indicated by reference numeral 110, is sized to fit within the connector 56. The connector port 110 is generally cylindrical in shape and has an insert end 112 and a extending end 114. The insert end 112 has a taper 116 to aid in installation of the insert end 116 into the connector 56.

An annular hub 118 with an increased outer radius is formed along the circumference of the connector port 110 proximate to the insert end 112. The annular hub 118 includes a tapered face 120 facing towards the insert end 112. Moreover, the annular hub 118 defines an annular detent 122 along the circumference of the connector port 110 which is sized to receive the valleys 96 of the clip 64. The connector port 110 is preferably constructed from stainless steel, however, various other materials may be employed.

Figure 10:
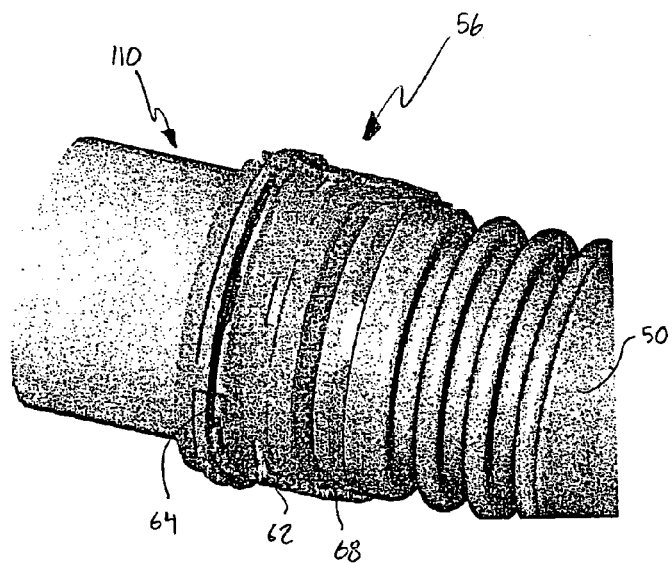
FIG. 10 is a perspective view of the connector port coupled to the duct assembly.
Figure 11:
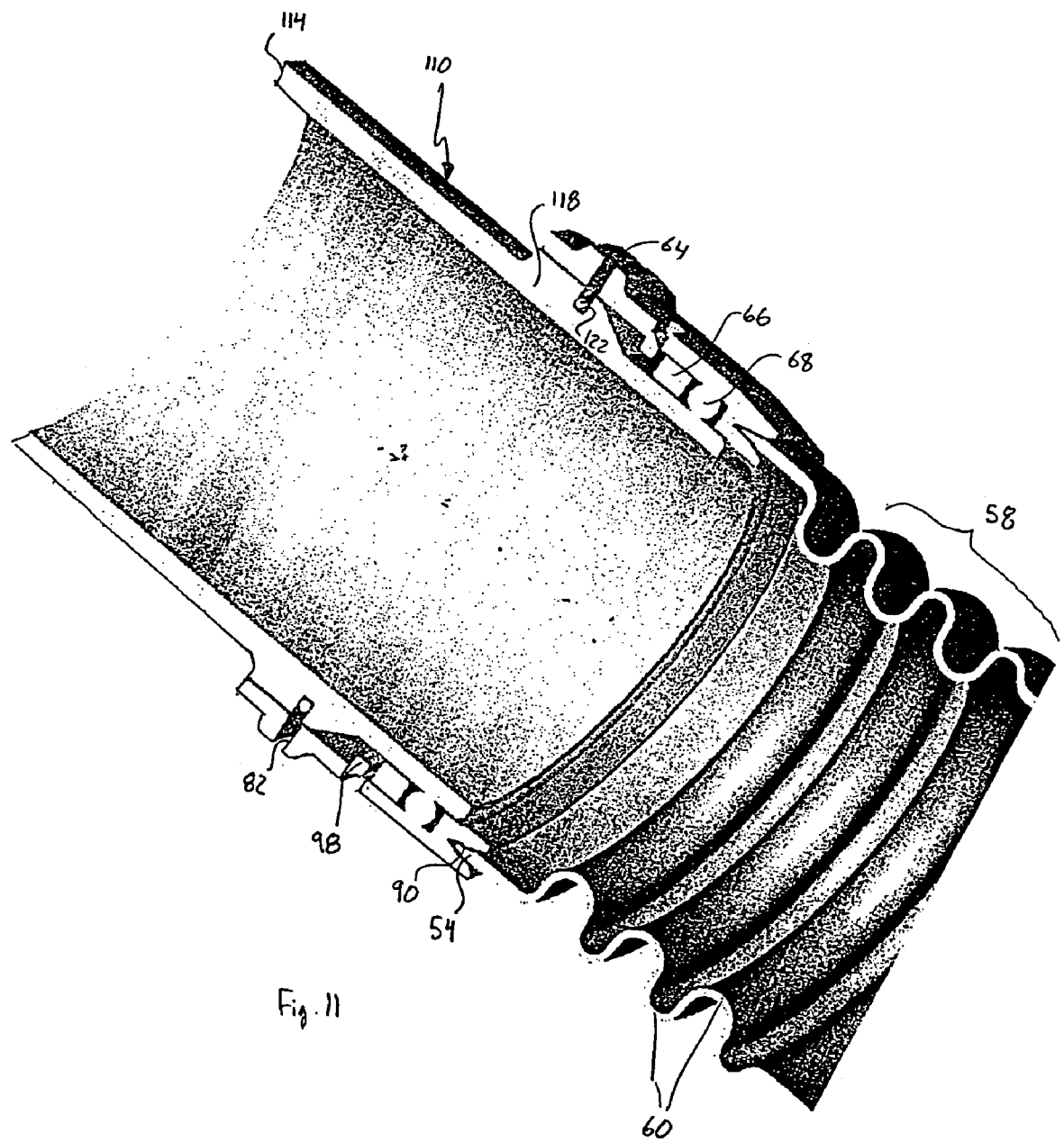
FIG. 11 is a side sectional view of the connector port coupled to the duct assembly.

With reference to FIGS. 10 and 11, the assembly of the connector 56 and the connector port 110 will now be described in greater detail. The end 54 of the duct 52 is inserted into the annular groove 90 of the collar 62 and secured using a spin weld. Alternative methods of securing the duct 52 to the collar 62 may be employed, such as adhesives or clamps.

The o-ring 68 has a diameter approximately equal to the diameter of the inner cavity 76 of the collar 62. The o-ring 68 is inserted into the inner cavity 76 until it abuts the annular wall 88 of the collar 62. The ring retainer 66 may then be inserted into the inner cavity 76. The ring retainer 66 slightly deforms until such time as the tabs 98 align with the ring slots 86. The tabs 98 extend through the ring slots 98 and create an interference fit between the ring retainer 66 and the collar 62. The o-ring 68 is confined by the ring retainer 66 and the annular wall 88 of the collar 62.

The clip 64 fits around the collar 62 such that the protrusions 94 align and fit within the clip grooves 82 formed on the collar 62 while the valleys 96 extend through the clip slots 84.

To sealingly lock the port connector 110 to the duct assembly 50, the insert end 112 of the connector port 110 is inserted into the collar 62. The outer diameter of the port connector 110 matches the inner diameter of the ring retainer 66 and the o-ring 68. The tapered face 120 of the port connector 110 engages the valleys 96 of the clip 64, urging the valleys 96 to move in a radial direction. The valleys 96 then snap into the annular detent 122 and secure the port connector 110 to the duct assembly 50. The o-ring is sealed to the port connector 110 and prevents leakage through the connector 56 and port connector 110 assembly.

The duct 52, the collar 62, and the ring retainer 66 are all constructed from a thermoplastic material, for example non-filled Nylon 6, using a process known as suction blow molding. During the suction blow molding process, a molten thermoplastic material is sucked into a closed mold by a vacuum created by a suction fan. Once the molten thermoplastic material has reached its final position, air is blown into the mold, forcing the thermoplastic material against the sides of the mold. After cooling, the part is removed. It is to be understood, however, that the duct 52, the collar 62, and the ring retainer 66 may alternatively be constructed from various other materials using a variety of different processes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A duct assembly comprising:
a thermoplastic tube segment; and
a connector comprising:
    a collar having an exterior surface, the collar being bonded to an end of the thermoplastic tube segment; and a clip having a plurality of tangs, the clip disposed about the exterior surface of the collar, the tangs being configured to releasably engage a mating connector when the connector is pushed onto the mating connector, wherein the tangs are a series of protrusions that alternate with a series of valleys formed about a circumference of the clip.

2. The duct assembly of claim 1, wherein the collar is welded to the end of the thermoplastic tube segment.

3. The duct assembly of claim 1, wherein the collar and the tangs are discrete and separately formed elements.

4. The duct assembly of claim 1, wherein the thermoplastic tube segment includes a plurality of deflectable convolutions.

5. A duct assembly comprising:
a first tube segment formed of a thermoplastic material;
a second tube segment;
a connector comprising:
   a collar, the collar being bonded to an end of one of the first and second tube segments;
   a clip having a plurality of resiliently inwardly biased tangs, the clip disposed about the exterior surface of the collar; and
   a port coupled to the other one of the first and second tube segments, the port including an annular projection,
wherein the tangs deflect outwardly in response to engagement of the connector to the port and thereafter the tangs retract to engage the annular projection to thereby resist decoupling of the connector and the port, and the tangs are protrusions formed at evenly spaced intervals such that the protrusions alternate about a circumference of the clip.

6. The duct assembly of claim 5, wherein the annular projection partially defines a generally U-shaped detent groove.

7. The duct assembly of claim 5, wherein the port further includes an annular tapered face connected to the annular projection and wherein contact between the annular tapered face and the tangs causes the tangs to deflect outwardly when the connector and the port are engaged to one another.

8. The duct assembly of claim 5, wherein the collar and the tangs are discrete and separately formed elements.

9. A duct assembly comprising:
a thermoplastic tube segment; and
a connector comprising:
   a collar, the collar being bonded to an end of the thermoplastic tube segment, the collar defining a plurality of apertures and having an exterior surface; and
   a clip having an annular body with a plurality of tangs, the annular body being received into a circumferentially extending groove that is formed in the exterior surface of the collar, the tangs extending through the apertures defined in the collar, the tangs being configured to releasably engage a mating connector when the connector is pushed onto mating connector, and the tangs are protrusions formed at spaced apart intervals about a circumference of the clip.

10. The duct assembly of claim 9, wherein the thermoplastic tube segment includes a plurality of deflectable convolutions.

11. The duct assembly of claim 9, wherein the collar is welded to the end of the thermoplastic tube segment.

* * * * *